(12) United States Patent
Liao et al.

(10) Patent No.: US 10,530,689 B2
(45) Date of Patent: Jan. 7, 2020

(54) DEVICE AND METHOD FOR ESTABLISHING A BLUETOOTH LOW ENERGY MESH NETWORK

(71) Applicant: Beken Corporation, Shanghai (CN)

(72) Inventors: Chia-Te Liao, Zhubei (TW); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 148 days.

(21) Appl. No.: 15/936,455

(22) Filed: Mar. 27, 2018

(65) Prior Publication Data

US 2019/0288942 A1 Sep. 19, 2019

(30) Foreign Application Priority Data

Mar. 13, 2018 (CN) .......................... 2018 1 0204188

(51) Int. Cl.
*H04L 12/741* (2013.01)
*H04W 4/80* (2018.01)
*H04W 8/00* (2009.01)
*H04L 12/721* (2013.01)
*H04L 29/08* (2006.01)

(52) U.S. Cl.
CPC .............. *H04L 45/74* (2013.01); *H04L 45/26* (2013.01); *H04W 4/80* (2018.02); *H04W 8/005* (2013.01); *H04L 67/12* (2013.01)

(58) Field of Classification Search
CPC ........ H04L 45/26; H04L 45/74; H04W 8/005; H04W 4/80
See application file for complete search history.

(56) References Cited

U.S. PATENT DOCUMENTS

| 2010/0118776 | A1* | 5/2010 | Iwasa ...................... H04L 45/72 370/328 |
| 2012/0207179 | A1* | 8/2012 | Ree .......................... H04L 67/12 370/465 |
| 2016/0302195 | A1* | 10/2016 | Zhang ............... H04W 72/0446 |
| 2018/0139683 | A1* | 5/2018 | Kwon ..................... H04W 4/80 |

OTHER PUBLICATIONS

"Mesh Profile—Bluetooth Specification"; Jul. 13, 2017; Bluetooth SIG—Mesh Working Group; pp. 1-331. (Year: 2017).*

(Continued)

*Primary Examiner* — Robert C Scheibel
(74) *Attorney, Agent, or Firm* — Schwegman Lundberg & Woessner, P.A.

(57) ABSTRACT

A method for establishing a BLE mesh network, comprising: receiving, by a first node, from a second node, a first network packet; determining, by the first node, whether the received first network packet has been received before, (a) determining whether the first node is a destination node if the received first network packet is different from the network packet stored in the buffer, performing an action defined by the first network packet if the first node is the destination node, and broadcasting the received first network packet through an advertising channel in the BLE mesh network if the first node is not the destination node; (b) dropping the received first network packet if the received first network packet is the same as at least one network packet stored in the buffer.

15 Claims, 5 Drawing Sheets

(56) References Cited

OTHER PUBLICATIONS

Jon Tanner & Robin Heydon; CSR Mesh Concepts; CSR plc; Bluetooth SIG; 2015.
Robin Heydon; 'Smart Mesh Protocol Proposal'; Bluetooth SIG; 2015.
Robin Heydon et al.; "Smart Mesh"; d05r28; Bluetooth SIG; Oct. 30, 2015.

* cited by examiner

Node A
ADV_TX<---scan window-----> ADV_TX<---scan window-----> ADV_TX<---scan window----->

Node B
<---scan window-----> ADV_TX<---scan window-----> ADV_TX<---scan window-----> ADV_TX Node C
----->ADV_TX<---scan window-----> ADV_TX<---scan window-----> ADV_TX<--- scan window

Fig. 4

DEVICE AND METHOD FOR ESTABLISHING A BLUETOOTH LOW ENERGY MESH NETWORK

CROSS REFERENCE TO RELATED APPLICATION

This application claims priority to Chinese application No. 201810204188.X, entitled "device and method for establishing a Bluetooth Low Energy mesh network," filed on Mar. 13, 2018 by Beken Corporation, which is incorporated herein by reference.

TECHNICAL FIELD

The present invention relates to Bluetooth transmission, and more particularly, but not limited to a device and method for establishing a Bluetooth Low Energy mesh network.

BACKGROUND

In Bluetooth Low Energy (BLE) protocol, a star topology is used in a BLE network, which enables an electrical device, such as a smart phone and a personal computer, to establish a point-to-point BLE connection with one or more BLE devices, such as a BLE mouse. The transmission distance between the electrical device and the BLE device is usually within 10 meters. However, if the electrical device needs to obtain a current status of one of the BLE devices in the BLE network and to control it to perform certain actions, the electrical device should be positioned close to the BLE device, which is not convenient. Therefore, it may be desirable to provide a device and method to establish a BLE mesh network in order to achieve a longer Bluetooth transmission distance.

SUMMARY

An embodiment of the invention discloses a method for establishing a Bluetooth Low Energy (BLE) mesh network, comprising: receiving, by a first node, from a second node, a first network packet, wherein the first node is located within a predetermined distance away from the second node; determining, by the first node, whether the received first network packet has been received before by comparing the received first network packet with a network packet stored in a buffer of the first node, (a) determining, by the first node, whether the first node is a destination node for the received first network packet if the received first network packet is different from the network packet stored in the buffer, performing, by the first node, an action defined by the first network packet if the first node is the destination node, and broadcasting, by the first node, the received first network packet through an advertising channel in the BLE mesh network if the first node is not the destination node; (b) dropping, by the first node, the received first network packet if the received first network packet is the same as at least one network packet stored in the buffer.

Another embodiment of the invention discloses a first Bluetooth Low Energy (BLE) node for establishing a BLE mesh network, comprising: a receiver configured to receive, from a second BLE node, a first network packet, wherein the first BLE node is located within a predetermined distance away from the second BLE node, and the second BLE node includes an electrical device; a first identifier coupled to the receiver and configured to determine whether the received first network packet has been received before by comparing the received first network packet with a network packet stored in a buffer of the first BLE node; a second identifier coupled to the first identifier and configured to determine whether the first BLE node is a destination node for the received first network packet if the received first network packet is different from the network packet stored in the buffer; an operator coupled to the second identifier and configured to perform an action defined by the first network packet if the first BLE node is the destination node; a transmitter coupled to the second identifier and configured to broadcast the received first network packet through an advertising channel in the BLE mesh network if the first BLE node is not the destination node; and a remover coupled to the first identifier and configured to dropping the received first network packet if the received first network packet is the same as at least one network packet stored in the buffer.

Another embodiment of the invention discloses a computer-readable storage medium storing instructions that, when executed by a processor in a first Bluetooth Low Energy (BLE) node, cause the first BLE node to: receive, with a receiver in the first BLE node, a first network packet from a second BLE node, wherein the first BLE node is located within a predetermined distance away from the second BLE node, and the second BLE node includes an electrical device; determine, with a first identifier coupled to the receiver, whether the received first network packet has been received before by comparing the received first network packet with a network packet stored in a buffer of the first BLE node; (a) determine, with a second identifier coupled to the first identifier, whether the first BLE node is a destination node for the received first network packet if the received first network packet is different from the network packet stored in the buffer; perform, with an operator coupled to the second identifier, an action defined by the first network packet if the first BLE node is the destination node; broadcast, with a transmitter coupled to the second identifier, the received first network packet through an advertising channel in the BLE mesh network if the first BLE node is not the destination node; (b) drop, with a remover coupled to the first identifier, the received first network packet if the received first network packet is the same as at least one network packet stored in the buffer.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

FIG. 4 is a sequence diagram showing a transmission of a network packet among slave nodes in a mesh network according to an embodiment of the invention.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
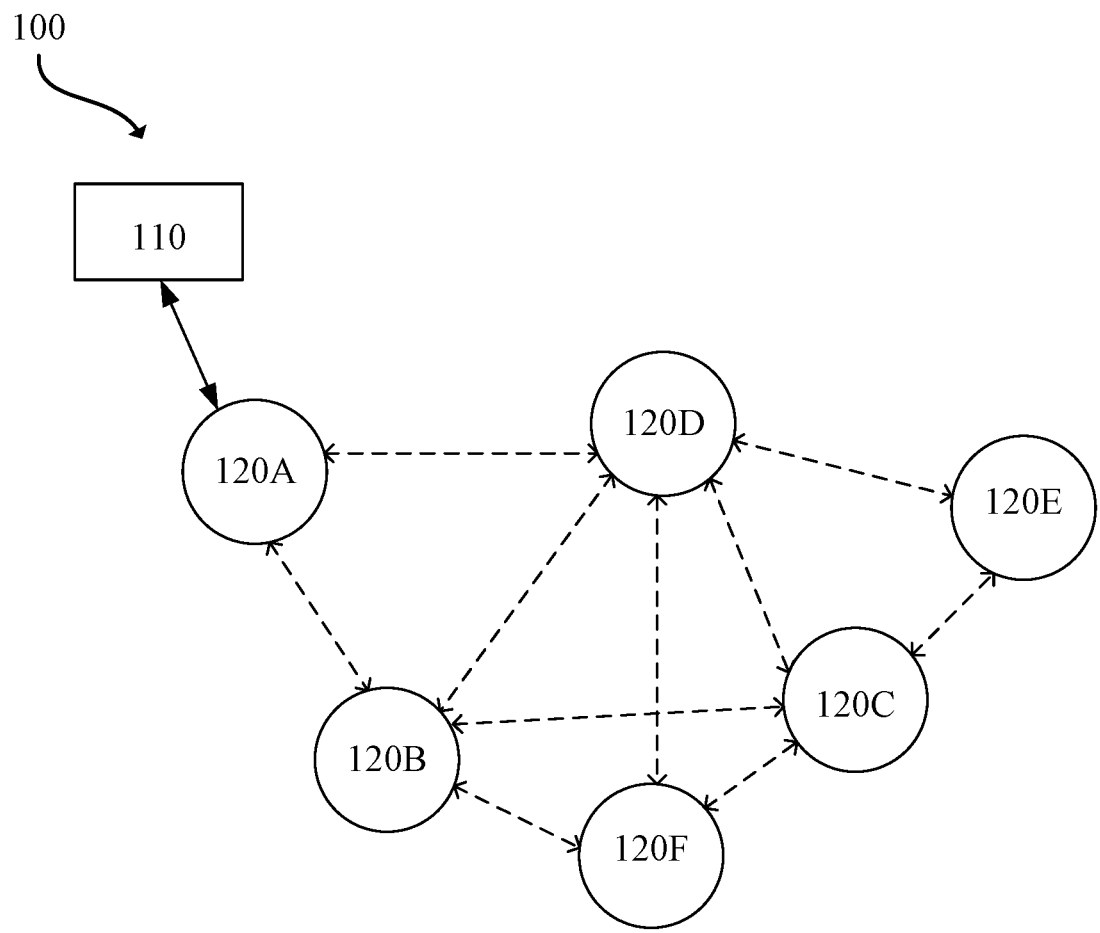
FIG. 1 shows an exemplary BLE mesh network in which the techniques introduced herein can be implemented.

FIG. 1 shows an exemplary BLE mesh network 100 in which the techniques introduced herein can be implemented. In FIG. 1, the BLE mesh network 100 comprises a master node 110 and one or more slave nodes 120A-120F. In an embodiment, the master node 110 is an electrical device including a smart phone, a personal computer and the like. The slave node, in an embodiment, is a BLE device, such us a BLE mouse. The distance between any two of the neighbor nodes in the mesh network is within a predetermined distance, such as 10 meters. In one embodiment, the master node 110 establishes a point-to-point BLE connection with the slave node 120A (as shown in solid line), and the slave node 120A is located within the predetermined distance away from the master node 110. In other embodiment, the master node 110 can establish the BLE connection with more than one slave nodes located within the predetermined distance away from the master node 110. When the BLE connection is established, the master node 110 transmits a network packet to the slave node 120A, and the slave node 120A transmits the received network packet through an advertising channel (as shown in dotted line) to all the nodes at scanning state (slave node 120B and 120D, for example, as shown in FIG. 1) within the predetermined distance away from the slave node 120A. Then, as shown in FIG. 1, the slave node 120B transmits the received network packet through the advertising channel to the slave node 120A, 120C, 120D and 120F. Similarly, the slave node 120D transmits the received network packet through the advertising channel to the slave node 120A, 120B, 120F, 120C and 120E. These nodes in the BLE network will subsequently transmit the received network packet to their neighbor nodes within the predetermined distance range until the network packet is transmitted to a destination node.

Since broadcasting the network packet is non-directional, any node can receive and transmit the network packet as long as the node is within the predetermined distance range. Thus, head of the network packet has been defined as follows to distinguish source and destination of a network packet:

| B0 | B1 | B2 | B3 | B4 | B5 | B6 | B7 | B8 | B9 | B10 | B11~B27 |
|---|---|---|---|---|---|---|---|---|---|---|---|
| Len | PTY | SN | SN | SN | SRC | SRC | DST | DST | TTL | PLen | Payload |

Wherein, Len refers to packet length. PTY refers to packet type. SN refers to sequence number. SRC refers to source address. DST refers to destination address. TTL refers to transfer level. PLen refers to payload length. Payload refers to data.

A source node refers to a slave node that receives a network packet from a master node via BLE connection. In an exemplary embodiment as shown in FIG. 1, the slave node 120A receives a network packet from the master node 110 and therefore the slave node 120A is defined as a source node of the network packet. After receiving the network packet, the source node 120A will change a format of the network packet by filling in related information of the head of the network packet as described above. If the source node 120A receives another new network packet from the master node 110, adding one to the sequence number (SN). The initial value of SN can be defined by a user, such as one. When one destination node, for example, the slave node 120F, receives the network packet, the slave node 120F performs an action defined in the payload of the network packet. If there are a plurality of destination nodes in the BLE mesh network, the slave node 120F will further broadcast the received network packet through the advertising channel so that other destination nodes can receive the network packet. Every time the network packet is transmitted by a slave node in the BLE network, the value of TTL will subtract one. If the value of TTL equals zero, the network packet will not be transmitted to a next node anymore. In one embodiment, the value of TTL can be 15 or any other number defined by the user according to actual requirement of the network coverage area.

Figure 2:
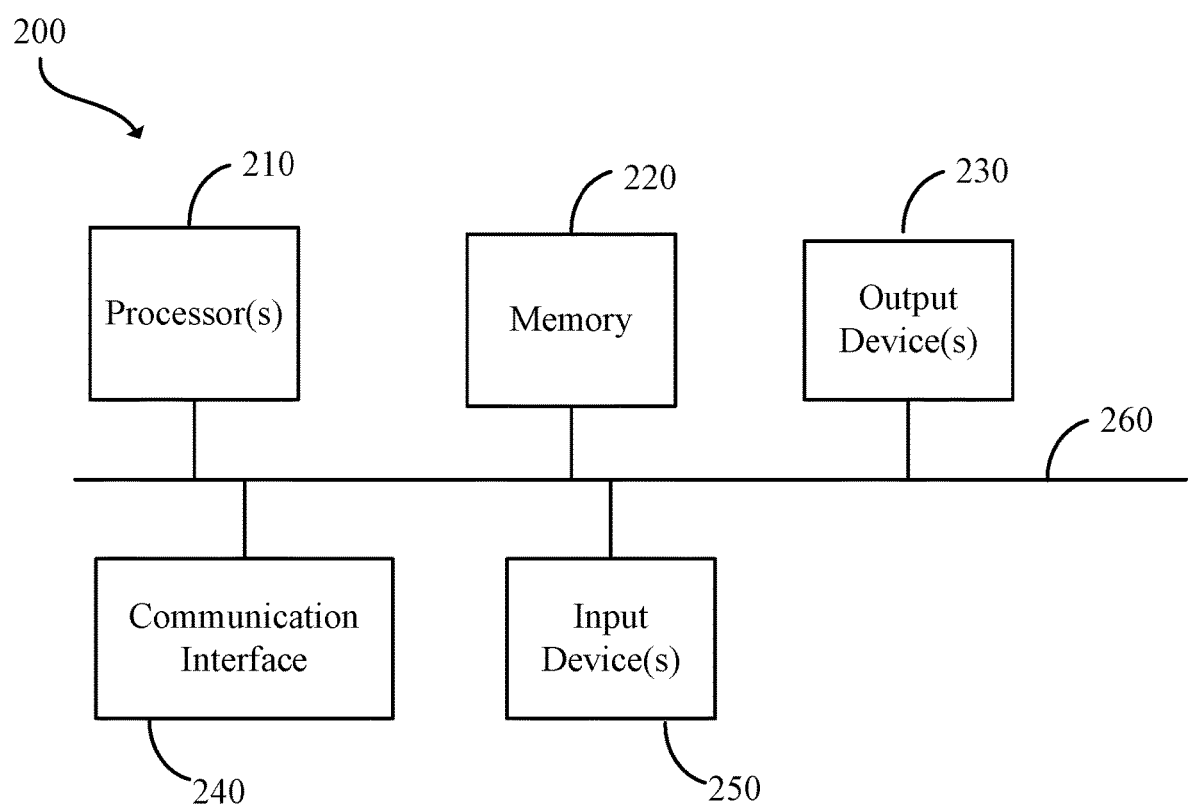
FIG. 2 is a high-level extent diagram showing an example of the architecture of a BLE node in the BLE mesh network.

FIG. 2 is a high-level extent diagram showing an exemplary architecture 200 of the slave node 120A of FIG. 1. Please note the slave nodes 120A-120F have a similar architecture. The architecture 200 includes one or more processors 210 and memory 220 coupled to an interconnect 260. The interconnect 260 shown in FIG. 2 is an abstraction that represents any one or more separate physical buses, point to point connections, or both, connected by appropriate bridges, adapters, or controllers. The interconnect 260, therefore, may include, for example, a system bus, a form of Peripheral Component Interconnect (PCI) bus, a Hyper-Transport or industry standard architecture (ISA) bus, a small computer system interface (SCSI) bus, a universal serial bus (USB), IIC (I2C) bus, a CAN-bus (Controller Area Network), or an Institute of Electrical and Electronics Engineers (IEEE) standard 1394 bus, also called "Firewire", and/or any other suitable form of physical connection.

The processor(s) 210 is/are the central processing unit (CPU) of the architecture 200 and, thus, control the overall operation of the architecture 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the architecture 200. The memory 220 represents any form of random access memory (RAM), read-only memory (ROM), flash memory, or the like, or a combination of such devices. In use, the memory 220 may contain, among other things, software or firmware code for use in implementing at least some of the embodiments of the invention introduced herein.

Also connected to the processor(s) 210 through the interconnect 260 is a communications interface 240, such as, but not limited to, a network adapter, one or more output device(s) 230 and one or more input device(s) 250. Note that the output device(s) 230 and the input device(s) 250, like other devices, are optional. The communications interface 240 provides the architecture 200 with the ability to communicate with other components in the space adjusting system 100 and may be, for example, an Ethernet adapter or Fibre Channel adapter. The input device 250 may include a touch screen, keyboard, and/or mouse, etc. The output device 230 may include a screen and/or speakers, etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "module", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Figure 3:
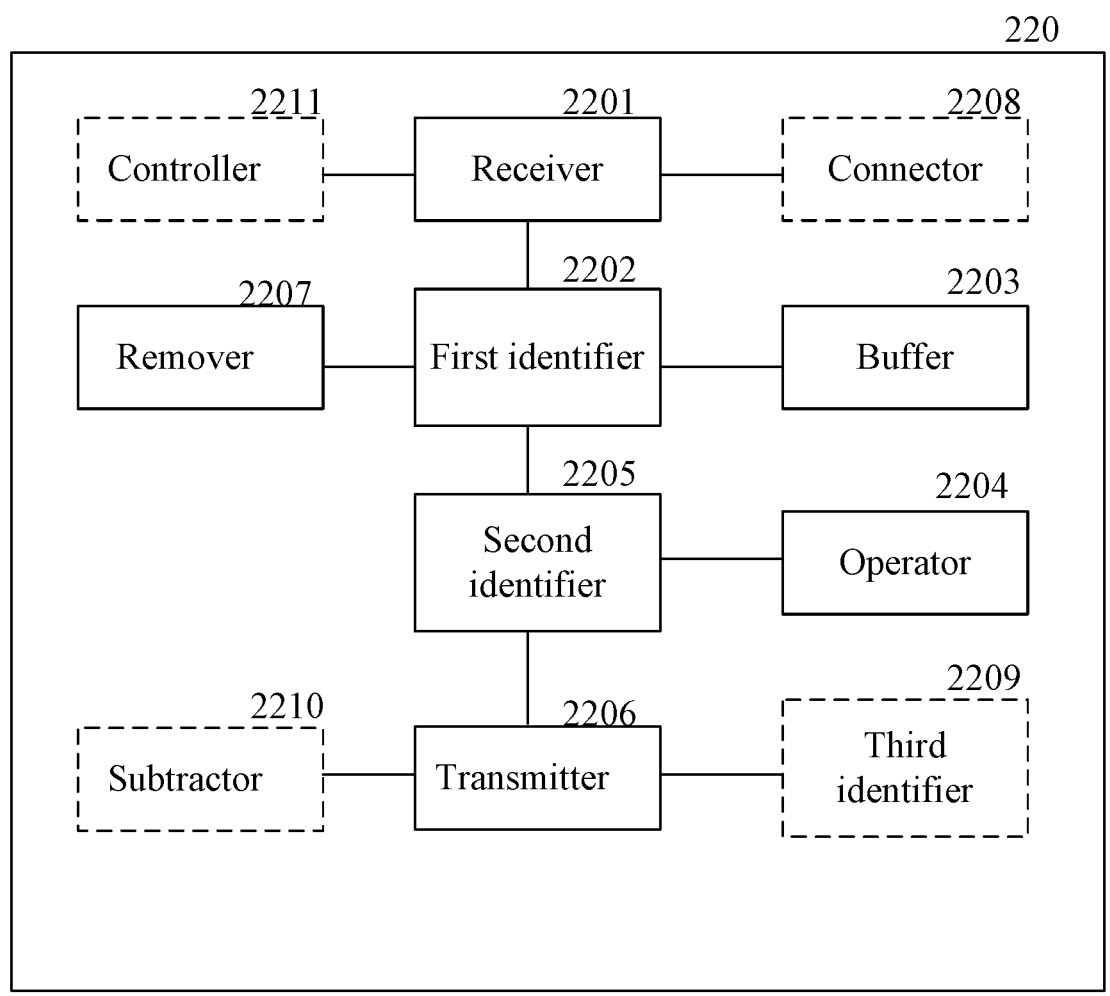
FIG. 3 is a block diagram showing elements of the memory of FIG. 2 according to an embodiment of the invention.

FIG. 3 is a block diagram showing elements of the memory 220 of the slave node 120A of FIG. 1 according to an embodiment of the invention. As shown in FIG. 3, the memory 220 of the slave node 120A comprises a receiver 2201, a first identifier 2202, a second identifier 2205, an operator 2204, a transmitter 2206, a remover 2207 and a buffer 2203. In one embodiment, the receiver 2201 is configured to receive a first network packet from the master node 110, or the slave node 120D or 120B, as shown in FIG. 1. The slave node 120A is located within a predetermined distance away from the master node 110, or the slave node 120D or 120B. The first identifier 2202 is coupled to the receiver 2201 and configured to determine whether the received first network packet has been received before by comparing the received first network packet with a network packet stored in the buffer 2203 of the slave node 120A. The buffer 2203 is coupled to the first identifier 2202. The second identifier 2205 is coupled to the first identifier 2202 and configured to determine whether the slave node 120A is a destination node for the received first network packet if the received first network packet is different from the network packet stored in the buffer. The operator 2204 is coupled to the second identifier 2205 and configured to perform an action defined by the first network packet if the slave node 120A is the destination node. The transmitter 2206 is coupled to the second identifier 2205 and configured to transmit the received first network packet through an advertising channel to all the nodes at scanning state within the predetermined distance away from the slave node 120A in the BLE mesh network if the slave node 120A is not the destination node. The remover 2207 is coupled to the first identifier 2202 and configured to drop the received first network packet if the received first network packet is the same as at least one network packet stored in the buffer 2203.

In one embodiment, the memory 220 further comprises a connector 2208. The connector 2208 is coupled to the receiver 2201 and is configured to establish a BLE connection with the master node 110.

In one embodiment, the memory 220 further comprises a third identifier 2209. The third identifier 2209 is coupled to the transmitter 2206 and is configured to determine whether a number of times of the first network packet allowed to be transmitted to a next node in the BLE mesh network reaches a preset upper limit value. The first network packet will not be transmitted any more if the number of times of the first network packet allowed to be transmitted reaches the preset upper limit value.

Consider now the techniques to increase the speed to transmit the network packet in the mesh network as described in FIG. 1, according to the following embodiments.

Scenario 1

Each time a network packet is transmitted to a slave node, if the slave node is not a destination node, the slave node will transmit the network packet to a next node. In one transmission, the slave node will broadcast a network packet for several times. For example, if a network packet is broadcasted by one slave node for 21 times per transmission and an interval of broadcasting is 100 millisecond (ms), the slave node will continuously broadcast the network packet for three times at high (e.g., 2480 Mhz), medium (e.g., 2426 Mhz) and low (e.g., 2402 Mhz) frequencies, respectively, and then wait for 100 ms of interval to broadcast the network packet for another three times, and so on. Thus, it will take 700 ms to broadcast the network packet for 21 times. If there are slave nodes A, B, C and D in the network with similar architectures as the slave nodes 120A-120F shown in FIG. 1 and the distance between the slave nodes A and B, B and C, C and D is all within 10 meters, the slave node A needs to broadcast 21*3=63 times and spend 700 ms*3=2100 ms to transmit a first network packet PK1 to the farthest slave node D. The issue is, if the slave node A needs to transmit a second network packet PK2 afterwards, PK2 cannot be transmitted until the transmission of PK1 (i.e., after 2100 ms) is complete, which will waste a lot of time.

The method of neighborhood map is used to solve the above issue and increase the transmission speed. In scenario 1, the slave node B is the neighbor node of the slave node A, and the slave node C is the neighbor node of the slave node B, and the slave node D is the neighbor node of the slave node C. If PK1 is going to be transmitted from the slave node A to the farthest slave node D through the slave node B and C, the slave node A will firstly transmit PK1 to the slave node B, and then the slave node B will transmit PK1 to the slave node C, and finally, the slave node C will transmit PK1 to the slave node D. Because of the characteristic of broadcasting, the slave node A will receive PK1 transmitted back by the slave node B, which means the slave node B has already received PK1. At this time, the slave node A will record a Bluetooth address of the slave node B in a neighborhood list. If the slave node A records the Bluetooth address of slave node B for a preset number of times, for example, three times, the slave node A identifies the slave node B as a neighbor node of the slave node A. Each node can identify its neighbor nodes in this way and calculate the total number of the neighbor nodes. When transmitting $PK_n$, after the slave node A receives $PK_n$, transmitted back from the slave node B, the slave node A will search the neighborhood list for the slave node B first, and if the Bluetooth address of the slave node B coincides with at least one Bluetooth address stored in the neighbor node list, a subtractor of the slave node A will proportionally subtracts a number of times of broadcasting $PK_n$, based on a total number of neighbor nodes. The determining expression is as follows:

```
if(message_cache[process_idx].
   Mesh_MSG_PKT[MESH_PKT_BCT_IDX] >
   (MESH_BC_TIME/sum_of_neighbor))
                                                  {
message_cache[process_idx].
   Mesh_MSG_PKT[MESH_PKT_BCT_IDX]-=
   (MESH_BC_TIME/sum_of_neighbor);
```

According to the expression above, if the slave node A has only one neighbor node, the number of times of broadcasting $PK_n$ (for example, 21 times) will be reduced to zero, i.e., the slave node A will not broadcast $PK_n$ anymore, so as to enable the subsequent network packet $PK_{n+1}$ to be transmitted and does not need to wait 700 ms, for example.

Scenario 2

When a master node continuously sends network packets including commands to one or more slave nodes to request status of all the slave nodes, or to control all the nodes to perform one action and return one result, the network will receive the network packet from each node within a predetermined range. For example, a slave node B is a neighbor node of a slave node A, and a slave node C is a neighbor node of the slave node B, and a slave node D is a neighbor node of the slave node C. The slave node A receives commands from the master node via BLE connection. In one embodiment, the slave node A distributes two commands Cmd 1 and Cmd 2 to request status of all the slave nodes. Since all the nodes are destination node, each node needs to know the status of all the other nodes, besides the status of themselves. All the nodes need to decode the network packet after receiving it, and return their status.

The status of the buffer of each node is listed in time order as follows:
Timing 1
Node_A{Node_A_Cmd1,Node_B_Cmd1_Rsp,Node_A_Cmd2}
Node_B{Node_A_Cmd1,Node_C_Cmd1_Rsp, Node_A_Cmd1_Rsp}
Node_C{Node_A_Cmd1,Node_D_Cmd1_Rsp, Node_B_Cmd1_Rsp}
Node_D{Node_A_Cmd1,Node_C_Cmd1_Rsp}
Timing 2
Node_A{Node_A_Cmd1,Node_B_Cmd1_Rsp,Node_A_Cmd2, Node_C_Cmd1_Rsp}
Node_B{Node_A_Cmd1,Node_C_Cmd1_Rsp, Node_A_Cmd1_Rsp, Node_D_Cmd1_Rsp, Node_B_Cmd1_Rsp}
Node_C{Node_A_Cmd1,Node_D_Cmd1_Rsp, Node_B_Cmd1_Rsp, Node_C_Cmd1_Rsp}
Timing N
Node_A{Node_A_Cmd1,Node_B_Cmd1_Rsp,Node_A_Cmd2, Node_C_Cmd1_Rsp, Node_A_Cmd1_Rsp, Node_D_Cmd1_Rsp}
Node_B{Node_A_Cmd1,Node_C_Cmd1_Rsp, Node_A_Cmd1_Rsp, Node_D_Cmd1_Rsp, Node_B_Cmd1_Rsp}
Node_C{Node_A_Cmd1,Node_D_Cmd1_Rsp, Node_B_Cmd1_Rsp, Node_C_Cmd1_Rsp, Node_A_Cmd1_Rsp}

It will take some time for all the nodes to read status of all the other nodes, besides the status of themselves. Thus, the transmission of the second command Cmd 2 will be delayed for a long time. In order to solve the issue, there are two methods to reduce latency as will be discussed below.

Method 1

In scenario 2 as described above, after any of the slave nodes A-D receives a second network packet including Cmd 2 soon after receiving the first network packet including Cmd1, the slave node will compare all the commands stored in its buffer with Cmd 2. Please note the first network packet and the second network packet have different sequence number (SN). If a type of command of the network packet stored in the buffer, for example, the type of Cmd1 of the first network packet, is the same as the type of Cmd 2, the slave node will delete the first network packet and a corresponding response to the first network packet (i.e., Cmd1_Rsp), and then transmit the second network packet. In this way, the first network packet will stop transmission and the response to the first network packet will be delayed to return, and thus the subsequent Cmd 2 of the second network packet can be transmitted timely. Please note the type of the command can be defined by a user. For example, the user can define the command "turn on the light" and the command "turn off the light" as the same type of command.

Method 2

In scenario 2 as described above, each of the slave nodes A-D establishes a transmission priority queue for the received network packets which need to be transmitted first. When any of the slave nodes A-D needs to transmit a network packet, it will check the transmission priority queue and firstly transmit the network packets listed therein. After the network packets listed in the transmission priority queue are all transmitted, the slave node will start to transmit the remaining received network packets.

Consider now the techniques to reduce conflicts in the transmission and increase effectiveness of the transmission of the network packet in the mesh network as described in FIG. 1, according to the following embodiments.

In some cases, the interval of broadcasting a network packet is the same, and two or more slave nodes will broadcast the network packet at the same time, which will cause the network packet failed to be received. The ideal mode is when one slave node is at advertising state to broadcast a network packet, the other slave nodes are at scanning state to receive the network packet. Since the slave nodes do not establish BLE connection with each other and they will not synchronize with each other, a method for dynamically broadcasting the network packet can be used to solve the above issue.

FIG. 4 is a sequence diagram showing a transmission of a network packet among slave nodes A-C in a mesh network according to an embodiment of the invention. Please note ADV_TX refers to a period in which the slave node is at advertising state to broadcast the network packet, and scan window refers to a period in which the slave node is at scanning state to receive the network packet. The advertising state and the scanning state will alternate with each other, as shown in FIG. 4. In an example shown in FIG. 4, the mesh network includes slave nodes A, B and C, and initially, all the slave nodes A, B and C have a long time interval of broadcasting, such as 300 ms. In one embodiment, the slave nodes A-C need to broadcast a connectable ADV packet through the mesh network. After receiving the connectable ADV packet, a controller of the slave node will randomly delay each of the slave nodes A, B or C for a predetermined period of time before broadcasting in order to prevent conflict due to simultaneously broadcasting the packet. After the slave node broadcasts the packet for a predetermined times, the controller will reduce the time interval of broadcasting to a predetermined value, such as 100 ms, in order to enable the other slave nodes that have not received the network packet and have long interval can easily receive the network packet. When the number of times of broadcasting the network packet reaches a preset upper limit value, the controller will switch the time interval back to an original long time interval. In this way, the slave node can broadcast the network packet dynamically, and can reduce conflicts between nodes in the transmission and increase effectiveness of the transmission of the network packet in the mesh network.

Figure 5:
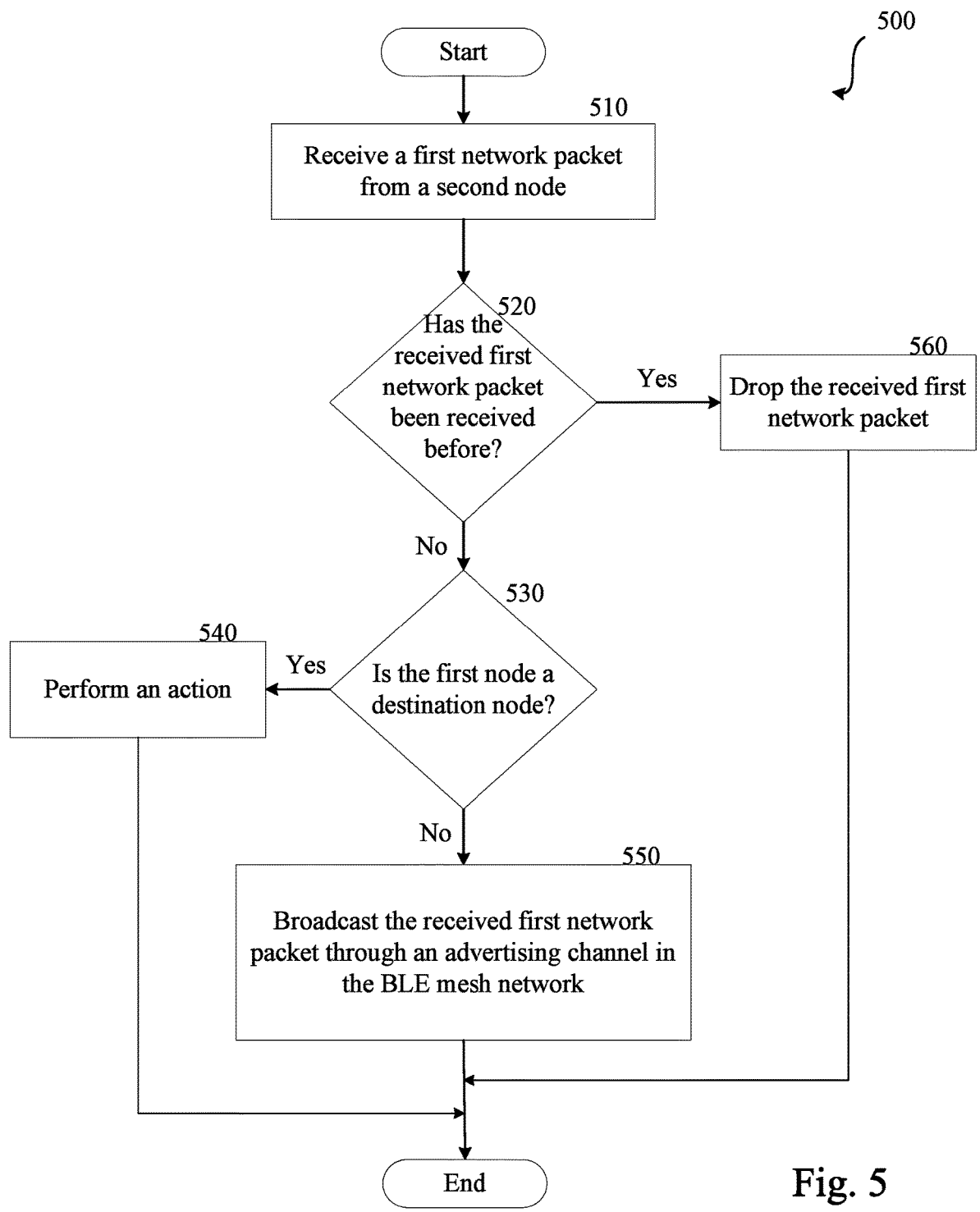
FIG. 5 is a flow diagram illustrating an example of an overall process flow for transmitting a network packet between nodes in a BLE mesh network according to an embodiment of the invention.

FIG. 5 is a flow diagram illustrating an example of an overall process flow 500 for transmitting a network packet between a first node and a second node in a BLE mesh network according to an embodiment of the invention.

In block 510, a first node receives a first network packet from a second node. The first node is located within a predetermined distance away from the second node. In block 520, the first node determines whether the received first network packet has been received before by comparing the received first network packet with a network packet stored in a buffer of the first node.

If the received first network packet is different from the network packet stored in the buffer, then in block 530, determining whether the first node is a destination node. If the first node is the destination node, the first node performs an action defined by the first network packet in block 540. If not, in block 550, the first node transmits the received first network packet through an advertising channel to all nodes at scanning state within the predetermined distance away from the first node in the BLE mesh network.

Referring back to block 520, if the received first network packet is the same as at least one network packet stored in the buffer, the first node drops the received first network packet in block 560.

Alternatively, the process 500 further comprises the second node includes an electrical device and the electrical device establishes a BLE connection with the first node.

Alternatively, the process 500 further comprises the first node determines whether a number of times of the first network packet allowed to be transmitted to a next node in the BLE mesh network reaches a preset upper limit value; and the first network packet will not be transmitted any more if the number of times of the first network packet allowed to be transmitted reaches the preset upper limit value.

Alternatively, the process 500 further comprises the first node performs the following: when receiving, from the second node, the first network packet which has been broadcasted before from the first node for a preset number of times, identifying the second node as a neighbor node of the first node and storing a Bluetooth address of the second node in a neighbor node list; and after that, when receiving, from the second node, a second network packet which has been broadcasted before from the first node, identifying a Bluetooth address of the second node coinciding with at least one Bluetooth address stored in the neighbor node list, and proportionally subtracting a number of times of broadcasting the second network packet based on a total number of neighbor nodes.

Alternatively, the process 500 further comprises the first node performs the following: receiving a second network packet soon after receiving the first network packet from the second node, and comparing the command of the network packet stored in the buffer of the first node with the command of the second network packet, wherein if a type of the command of the network packet stored in the buffer is the same as that of the second network packet, transmitting the second network packet and deleting the network packet stored in the buffer with the same type of command and a corresponding response to the network packet stored in the buffer with the same type of command.

Alternatively, the process 500 further comprises the first node performs the following: establishing a transmission priority queue for the network packets received by the first node which need to be transmitted first; transmitting the network packets listed in the transmission priority queue; and starting to transmit the remaining received network packets after the network packets listed in the transmission priority queue are all transmitted.

Alternatively, the process 500 further comprises the first node performs the following: randomly delaying for a predetermined period of time after receiving the first network packet; reducing a time interval of broadcasting the first network packet; and switching the interval back to an original time interval when the number of times of the network packet being broadcasted by the first node reaches a preset upper limit value.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A method for establishing a Bluetooth Low Energy (BLE) mesh network, comprising:
   receiving, by a first node, from a second node, a first network packet, wherein the first node is located within a predetermined distance away from the second node;
   determining, by the first node, whether the received first network packet has been received before by comparing the received first network packet with a network packet stored in a buffer of the first node,
   (a) determining, by the first node, whether the first node is a destination node for the received first network packet if the received first network packet is different from the network packet stored in the buffer, performing, by the first node, an action defined by the first network packet if the first node is the destination node, and broadcasting, by the first node, the received first network packet through an advertising channel in the BLE mesh network if the first node is not the destination node;

(b) dropping, by the first node, the received first network packet if the received first network packet is the same as at least one network packet stored in the buffer;

when receiving, by the first node from the second node, the first network packet which has been broadcasted before from the first node for a preset number of times, identifying the second node as a neighbor node of the first node and storing a Bluetooth address of the second node in a neighbor node list; and after that, when receiving by the first node from the second node, a second network packet which has been broadcasted before from the first node, identifying a Bluetooth address of the second node coinciding with at least one Bluetooth address stored in the neighbor node list, and proportionally subtracting a number of times of broadcasting the second network packet based on a total number of neighbor nodes.

2. The method of claim 1, wherein the second node includes an electrical device and the electrical device establishes a BLE connection with the first node.

3. The method of claim 1, wherein if there are a plurality of destination nodes in the BLE mesh network and the first node is one of the plurality of destination nodes and the received first network packet is different from the network packet stored in the buffer, the first node performs the action defined by the first network packet and broadcasts the received first network packet through the advertising channel in the BLE mesh network.

4. The method of claim 1, further comprising:
determining, by the first node, whether a number of times of the first network packet allowed to be transmitted to a next node in the BLE mesh network reaches a preset upper limit value; and
the first node stops transmitting the first network packet if the number of times of the first network packet allowed to be transmitted reaches the preset upper limit value.

5. The method of claim 1, further comprising the first node performs the following:
establishing a transmission priority queue for the network packets received by the first node which need to be transmitted first;
transmitting the network packets listed in the transmission priority queue; and
starting to transmit the remaining received network packets after the network packets listed in the transmission priority queue are all transmitted.

6. A method for establishing a Bluetooth Low Energy (BLE) mesh network, comprising:
receiving, by a first node, from a second node, a first network packet, wherein the first node is located within a predetermined distance away from the second node;
determining, by the first node, whether the received first network packet has been received before by comparing the received first network packet with a network packet stored in a buffer of the first node,
(a) determining, by the first node, whether the first node is a destination node for the received first network packet if the received first network packet is different from the network packet stored in the buffer, performing, by the first node, an action defined by the first network packet if the first node is the destination node, and broadcasting, by the first node, the received first network packet through an advertising channel in the BLE mesh network if the first node is not the destination node;

(b) dropping, by the first node, the received first network packet if the received first network packet is the same as at least one network packet stored in the buffer;

receiving, by the first node, a second network packet after receiving the first network packet from the second node, and comparing the command of the network packet stored in the buffer of the first node with the command of the second network packet, wherein if a type of the command of the network packet stored in the buffer is the same as that of the second network packet, transmitting the second network packet and deleting the network packet stored in the buffer with the same type of command and a corresponding response to the network packet stored in the buffer with the same type of command.

7. The method of claim 6, wherein the second node includes an electrical device and the electrical device establishes a BLE connection with the first node.

8. The method of claim 6, wherein if there are a plurality of destination nodes in the BLE mesh network and the first node is one of the plurality of destination nodes and the received first network packet is different from the network packet stored in the buffer, the first node performs the action defined by the first network packet and broadcasts the received first network packet through the advertising channel in the BLE mesh network.

9. The method of claim 6, further comprising:
determining, by the first node, whether a number of times of the first network packet allowed to be transmitted to a next node in the BLE mesh network reaches a preset upper limit value; and
the first node stops transmitting the first network packet if the number of times of the first network packet allowed to be transmitted reaches the preset upper limit value.

10. The method of claim 6, further comprising the first node performs the following:
establishing a transmission priority queue for the network packets received by the first node which need to be transmitted first;
transmitting the network packets listed in the transmission priority queue; and
starting to transmit the remaining received network packets after the network packets listed in the transmission priority queue are all transmitted.

11. A method for establishing a Bluetooth Low Energy (BLE) mesh network, comprising:
receiving, by a first node, from a second node, a first network packet, wherein the first node is located within a predetermined distance away from the second node;
determining, by the first node, whether the received first network packet has been received before by comparing the received first network packet with a network packet stored in a buffer of the first node,
(a) determining, by the first node, whether the first node is a destination node for the received first network packet if the received first network packet is different from the network packet stored in the buffer,
performing, by the first node, an action defined by the first network packet if the first node is the destination node, and broadcasting, by the first node, the received first network packet through an advertising channel in the BLE mesh network if the first node is not the destination node;

(b) dropping, by the first node, the received first network packet if the received first network packet is the same as at least one network packet stored in the buffer;

randomly delaying, by the first node, for a predetermined period of time after receiving the first network packet;

reducing, by the first node, a time interval of broadcasting the first network packet; and switching, by the first node, the interval back to an original time interval when the number of times of the network packet being broadcasted by the first node reaches a preset upper limit value.

12. The method of claim 11, wherein the second node includes an electrical device and the electrical device establishes a BLE connection with the first node.

13. The method of claim 11, wherein if there are a plurality of destination nodes in the BLE mesh network and the first node is one of the plurality of destination nodes and the received first network packet is different from the network packet stored in the buffer, the first node performs the action defined by the first network packet and broadcasts the received first network packet through the advertising channel in the BLE mesh network.

14. The method of claim 11, further comprising:
determining, by the first node, whether a number of times of the first network packet allowed to be transmitted to a next node in the BLE mesh network reaches a preset upper limit value; and the first node stops transmitting the first network packet if the number of times of the first network packet allowed to be transmitted reaches the preset upper limit value.

15. The method of claim 11, further comprising the first node performs the following:
establishing a transmission priority queue for the network packets received by the first node which need to be transmitted first;

transmitting the network packets listed in the transmission priority queue; and starting to transmit the remaining received network packets after the network packets listed in the transmission priority queue are all transmitted.

* * * * *